United States Patent [19]
Atencio

[11] 4,143,990
[45] Mar. 13, 1979

[54] DAM WITH MOVABLE HYDROELECTRIC ASSEMBLY

[76] Inventor: Francisco J. G. Atencio, Estafeta Dr. Garcia, Diamante Entre Rios, Argentina

[21] Appl. No.: 792,493

[22] Filed: Apr. 29, 1977

[51] Int. Cl.² .................................................. E02B 9/00
[52] U.S. Cl. ........................................... 405/78; 290/53
[58] Field of Search ............. 61/19, 20, 63, 43, 69 A, 61/69 R, 86; 290/53, 42, 43, 44, 52; 417/234, 100; 415/181; 416/85

[56] References Cited

U.S. PATENT DOCUMENTS

| | | | |
|---|---|---|---|
| 608,203 | 8/1898 | Knobloch | 61/20 |
| 914,399 | 3/1909 | Fancher | 61/19 |
| 1,002,241 | 9/1911 | Eells | 61/19 |
| 1,042,381 | 10/1912 | Baker | 61/19 |
| 1,670,140 | 5/1928 | Cole | 61/19 X |
| 2,163,102 | 6/1939 | Odill | 61/19 |
| 2,764,871 | 10/1956 | Dowling | 61/19 |
| 2,945,960 | 7/1960 | Obrist | 290/52 |
| 3,097,491 | 7/1963 | Pugh | 61/19 |
| 3,184,218 | 5/1965 | Hochwalt et al. | 415/117 |

FOREIGN PATENT DOCUMENTS

| | | | |
|---|---|---|---|
| 19028 | 9/1914 | France | 61/19 |
| 9681 | 7/1923 | Netherlands | 61/19 |

OTHER PUBLICATIONS

Engineering News-Record, Nov. 16, 1950, pp. 35 and 36.

Primary Examiner—Dennis L. Taylor
Attorney, Agent, or Firm—Emory L. Groff, Jr.

[57] ABSTRACT

Movable hydroelectric assembly for a water storing dam, having means for movably permitting positioning respective with the main body of said dam, in a downwardly/upwardly pattern displacement being coplanarly arranged or rotatably arranged. Additionally, the hydroelectric assembly has a machine hall with auxiliary equipment required to: start, keep running, and stop the turbine generator set. A diffuser is provided having a substantially rectilinear water flow circulation path, or a slightly angulated one.

12 Claims, 5 Drawing Figures

DAM WITH MOVABLE HYDROELECTRIC ASSEMBLY

The present invention relates to improved hydroelectric assemblies for water storing structures such as dams, flood control hydraulic structures, irrigation dams, spillways, sluiceways at the bottom of dams, navigable waterway controlling structures, etc. The hydroelectric assemblies are constructed to perform either in the electric energy generation field or alternatively, in the energy accumulation field when acting in the reverse mode.

Hydroelectric assemblies for electric energy production or for energy accumulation in pumped storage systems are, obviously, well known in the art. The aim of these hydromotive assemblies, positioned in combination with water passages or outlets engineered through the structural bodies of the hydraulic structure, is to provide for the conversion of the inherent gravitational energy of the mass of water stored in the reservoir positioned behind such dams into electric energy to feed surrounding electrical networks. In the reverse mode, the available inherent gravitational energy is increased by using electric energy from other generation sources to pump water into the reservoir thus maximizing the electric power energy interchange pattern defined within a given electrical system network serving a geographical area. The need to provide for this conversion is particularly imperative at this energy conscious time and the situation is especially significant in low-head hydraulic systems because these are usually located in the vicinity of the most demanding electrical markets.

A shortcoming of many existing hydroelectric systems is associated with the inherent low-head hydraulic conditions. The extremely variable low-head installations are the most vulnerable to fluctuating seasonal river flow hydrological conditions. In droughts, the water flow is so reduced that nearly all the firm capacity is lost while in floods, the hydraulic head is so reduced that the ability to produce electric power is mostly lost. Additionally, the dam structure must be constructed in a manner capable of coping with the task of negotiating such floods, such provision being a costly factor in itself.

Another drawback of many hydraulic structures designed mainly for navigation purposes, is the short annual life operativeness of certain structural components provided in the main body of the respective dams. One of these components, the spillway, requires a substantial financial investment yet is fully utilized only a few hours in the average year when the river flow is in nearly a complete flood stage.

By the present invention hydroelectric power production will be readily available without requiring construction of concrete structures having highly expensive and intricate water intakes, scrolls, bends, diffusers, etc. This is achieved by the provision of a very compact arrangement comprising a controllably displaceable or movable hydroelectric assembly concept thus lending notable flexibility to the field of hydroelectric generation erection procedures. This assembly may be readily positioned into its use position with the associated dam structure or slightly moved therefrom according to the dictates of the variable hydrological conditions of the involved river. In other words, when a river flow is depleted due to drought conditions and the spillway of a dam becomes inoperative, then the displaceable or movable hydroelectric assembly may be positioned against the water outlet of such spillway for the purpose of producing energy from the reservoir stored behind the dam. Alternately, when a flood condition exists and imposes a non-producing hydroelectric status due to a hydraulic head reduction, then, the movable hydroelectric assembly is displaced away from the dam outlet and disposed in a position whereupon the spillway is free and the respective water outlet is unobstructed to permit the passage of flood waters.

The present novelty in low-head hydroelectric generation provides a unique flexible arrangement for the purpose of hydroelectric generation or combined hydroelectric generation/accumulation planning which may be adapted to river watersheds heretofore qualified as energetically unprofitable or energetically impossible to utilize up to this time, because of technical and finanical limitations.

Another area which may profit from the present novelty will be the many concrete hydraulic structures such as dam spillways existing for non-energy production purposes. These installations can be readily adapted for hydroelectric production by employing the instant structure. Many installations would qualify under the foregoing category. Included would be hydraulic structures such as dams for navigation systems, inoperative locks on navigation systems, abandoned dikes and the like, many of which could easily be transformed and adapted into feasible hydropower generation stations.

It is proposed that the present hydromotive assembly incorporate capsule-mounted hydroelectric generation sets having fix-bladed propeller turbines or movable-bladed Kaplan turbines. This insures maximum flexibility and efficient operation under low water heads with the generation set disposed upon a horizontal axis or a smooth, slanted axis. Preferably, the hydroelectric generation set is combined, to form a unitary hydromotive assembly including a substantially rectilinear draft tube or diffuser. In the overall arrangement, this movable hydromotive assembly is positioned upstream in combination with the vane outlets adjacent the gated water directing means feeding the spillway of a dam. The movable hydromotive assembly is provided with water retaining structure at its downstream open end having an area at least sufficient to insure the full closure of the involved spillway's vanes when the hydromotive assembly is displaced into its energy transformation mode position. When thusly positioned, and the gates of the spillway are fully opened, the body of water stored behind the dam will be precluded from direct passage through the spillway and thus retained in the reservoir to be fully available for passage through the hydromotive assembly for the production of hydroelectric energy.

Alternative embodiments of the present invention are proposed. One aspect involves mounting the horizontally disposed hydromotive assembly for vertical planar displacement upon a plurality of suitably anchored legs which are likewise vertically disposed such that the hydromotive assembly, when in its elevated position, is axially aligned with the water directing means or passage through the dam body and spillway gate and when lowered to its alternate position, the hydromotive assembly will be disposed in a plane entirely beneath the level of the water directing means of the dam body. An alternate arrangement proposes the employment of a hydromotive assembly wherein at least the diffuser, or downstream portion is disposed at a slight upwardly slanted axis relative the balance of the assembly. In this latter embodiment, the upstream portion of the assembly is pivotally mounted at a fixed point to provide angular displacement of its downstream open end about a pivot axis extending parallel to the upstream face of the dam main body.

Accordingly, one of the objects of the present invention is to provide an improved hydroelectric assembly offering superior flexibility in a low water head environment which inherently involves alternate drought and flood conditions.

A further object of the present invention is to provide an improved hydroelectric assembly including a movable hydromotive assembly mounted adjacent a dam main body for controllable vertical displacement of its position relative thereto.

Still another object of the present invention is to provide an improved hydroelectric assembly having a displaceable hydromotive assembly provided with water retaining means at its downstream open end and which is alternately displaceable between a first position overlying and surrounding a water passage through the dam main body, to a second position wherein the downstream open end of the hydromotive assembly is in a position well removed from the horizontal path leading to the dam water passage.

Another object of the present invention is to provide an improved hydroelectric assembly including a movable hydromotive assembly having a substantially horizontally disposed longitudinal axis and which is mounted upon a plurality of fixed supports for vertical displacement in a horizontal planar manner between alternate elevations.

A further object of the present invention is to provide an improved hydroelectric assembly including a movable hydromotive assembly mounted upon a fixedly disposed pivot adjacent its upstream end and including a downstream open end disposed at an upwardly slanted angle relative the upstream end such that displacement about said pivot alternately displaces the downstream end from a position overlying and surrounding a water passageway through the dam main body to a position below the passageway.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawings, in which.

Similar reference characters designate corresponding parts throughout the several figures of the drawings.

Figure 1:
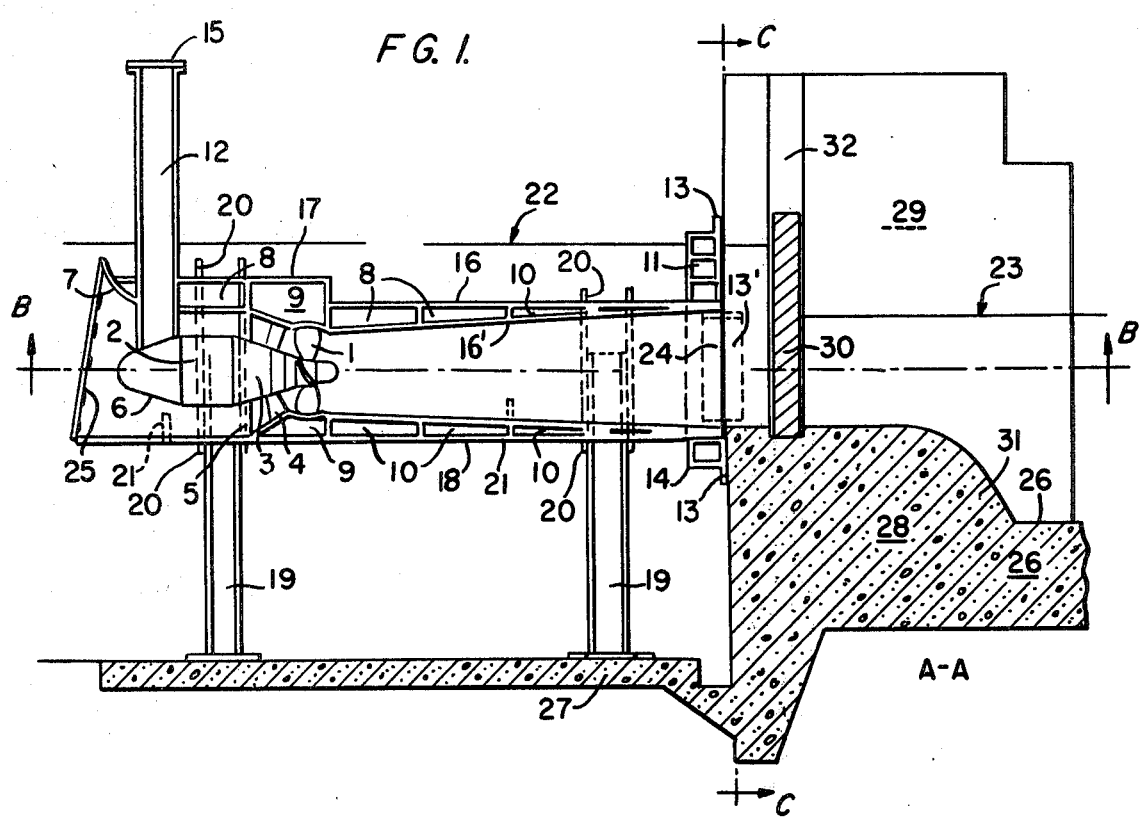
FIG. 1 is a longitudinal vertical view of the present invention as it appears when the hydromotive assembly is disposed in an energy transformation mode.
Figure 2:
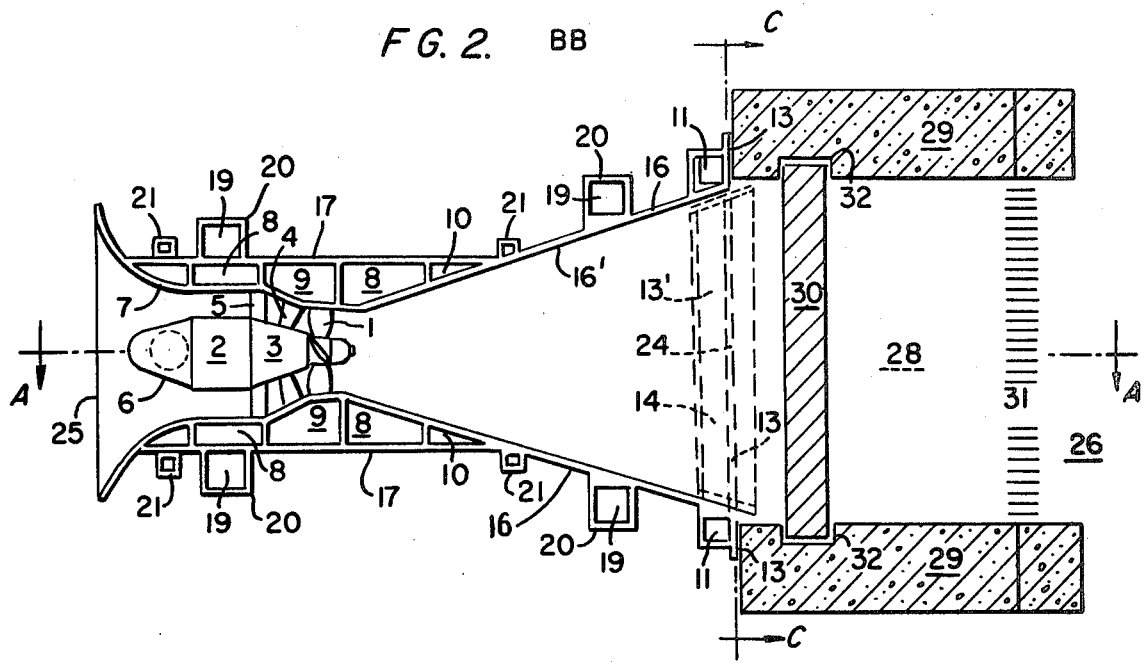
FIG. 2 is a top plan view of the structure of FIG. 1.
Figure 3:
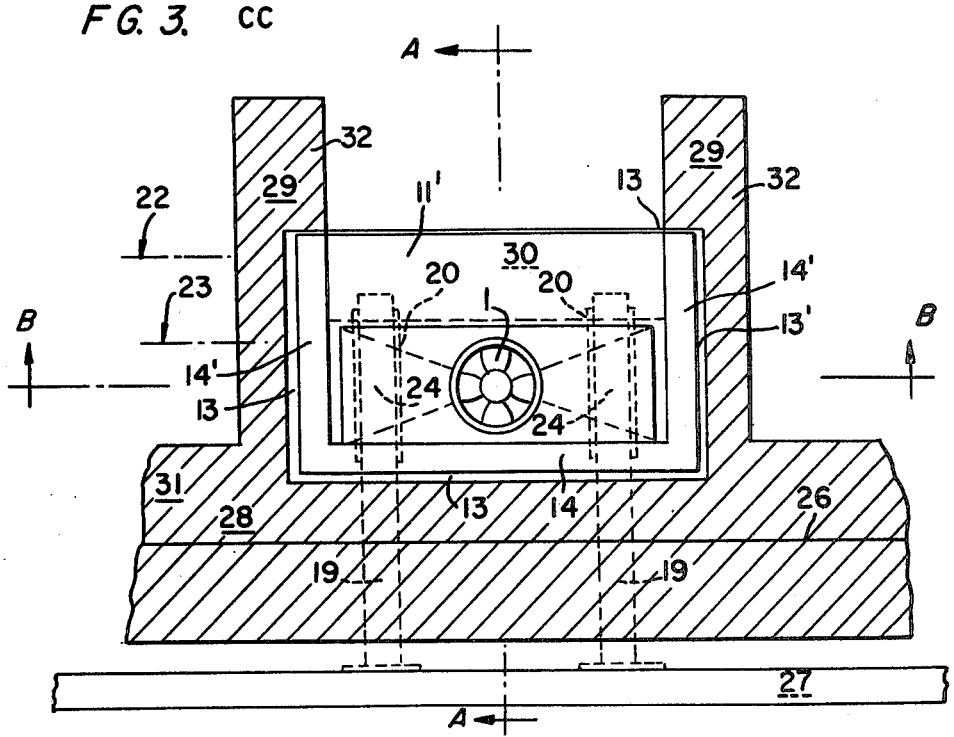
FIG. 3 is a transverse view, partly in section, along the line C—C of FIG. 1.

Referring now to the drawings, particularly FIGS. 1 and 2, the present invention will be seen to include a hydromotive assembly 17 comprising an integral unit mounted for controllable displacement juxtaposed the upstream face of a dam main body 28. Included within the hydromotive assembly 17 is a hydroelectric generation set or energy transformation unit including a forwardmost turbine 1 joined to an electric generator 2 by means of connecting shaft 3. Intermediate the turbine 1 and generator 2 are the movable-bladed distributor 4 and fix-bladed distributor 5. The entire electric generation set is preferably hermetically enclosed such as by the surrounding capsule 6 and is suitably affixed within the interior of the longitudinally extending conduit serving as a water flow circulation path through the assembly which conduit is defined by the interior lateral wall 7. A plurality of chambers are provided within the interior of the structure of the hydromotive assembly 17 and include chambers 8 for the storage of spare parts, and alternatively, acting as hermetic chambers to be filled with fluid for sinking purposes, or with gas for flotation purposes, chambers 9 serving as machine halls and chambers 10 for the purpose of containing fluids. Disposed in a surrounding manner adjacent the downstream open end 24 of the hydromotive assembly conduit are fixed or movable water retaining means 11, the purpose of which will be described hereinafter.

Means for sealing and retaining the hydromotive assembly in its alternate positions are provided in the form of fixed fastening and securing members 13 and movable securing elements 13'.

The hydromotive assembly 17 includes a longitudinally extending diffuser 16 disposed downstream of the electric generation set capsule 6 and the interior wall 16' thereof provides an extension of the water circulation path conduit established by the lateral wall 7 surrounding the capsule 6.

Figure 4:
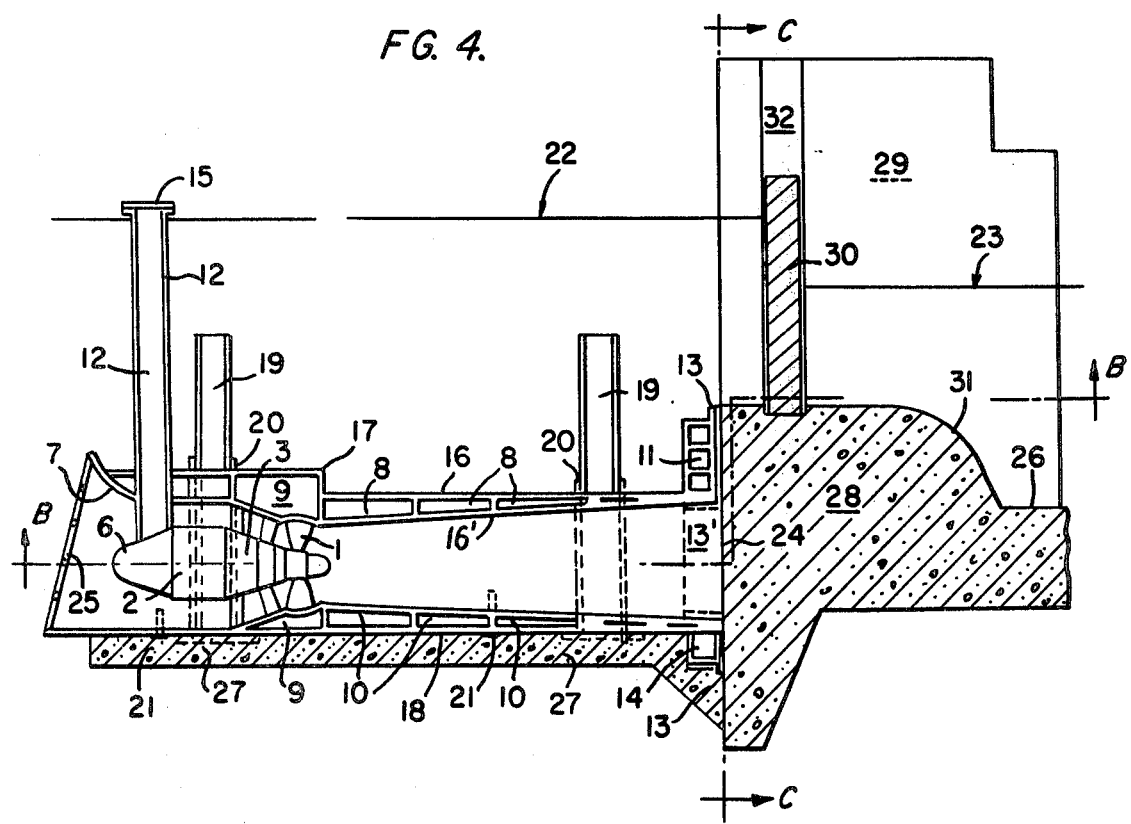
FIG. 4 is a view similar to FIG. 1 and illustrates the hydromotive assembly when displaced to its alternate position below the level of the water passageway through the dam main body.

The hydromotive assembly 17 is maintained in proper spaced apart relationship with respect to the upstream face of the dam body 28 by means of a plurality of extensible support legs 19 suitably affixed to the upstream slab 27 and extending upwardly therefrom to a point preferably at least coinciding with a horizontal plane which if extended, would pass through the water passage through the dam body 28. A corresponding number of vertical guide members, such as the channels 20 are formed within or rigidly affixed to the exterior of the hydromotive assembly 17, with each said guide member 20 cooperating with one of the supporting legs 19 in a vertically slidable manner to allow of the controllable displacement of the hydromotive assembly between the two alternate positions as shown in FIGS. 1 and 4 of the drawings. Hydraulic jack members may be included as at 21 to aid in the displacement of the hydromotive assembly between its alternate positions.

The aforedescribed structure includes reinforcing supporting means 14 and lateral reinforcing supporting means 14' associated with the water retaining structure 11 adjacent the downstream open end 24 such that when the hydromotive assembly is in its elevated position as shown in FIGS. 1 and 2, a close sealing engagement is accomplished with the upstream face of the dam main body 28 in the area of the lateral walls 29 of the spillway vane outlet, which walls define therebetween fluid flow directing means or a water passage through the dam main body. This water passage may be selectively closed off by means of the vertically displaceable spillway gate 30 leading to the spillway 31 having a bottom slab 26. The gate 30 is suitably supported for vertical movement within appropriate slots and supporting rails 32 so that when elevated therebetween from a position as shown in FIG. 1, all inherent energy contained within the water stored upstream as indicated by water level 22, is available for passage through the water flow conduit of the hydromotive assembly and the open fluid directing means between the lateral walls of the spillway vane outlet.

Figure 5:
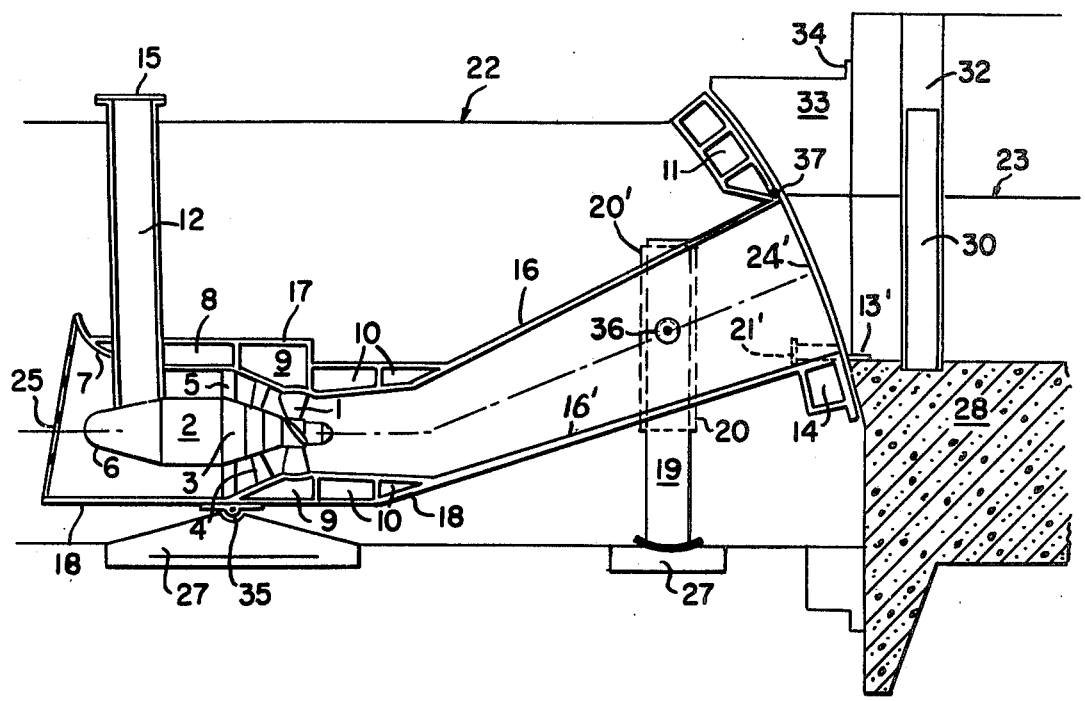
FIG. 5 is a longitudinal vertical view of another embodiment of the invention.

As previously described, the water retaining structure 11 may be fixed or movable and is illustrated in FIGS. 1, 2, 3 and 4 as being a fixed integral portion of the downstream end of the hydromotive assembly. In the embodiment of FIG. 5, the water retaining structure 11 comprises a movable member and is illustrated as it appears when positioned and placed in its upper position to provide a restriction to the otherwise considerably enlarged cross-sectional area of the water passageway when the gate 30 is opened.

The embodiment shown in FIG. 5 of the drawings relates to a modified hydromotive assembly 17 wherein the diffuser portion 16 thereof is slightly slanted upwardly from the horizontal disposition of the portion of the assembly containing the electric generation set capsule 6. In this form the bottom 18 of the hydromotive assembly is fixedly attached relative the upstream slab 27 by means of a pivot mechanism 35 having its axis disposed substantially parallel to the upstream face of the dam main body 28. As it will be seen in this figure of the drawings, the pivot point 35 is disposed beneath that portion of the hydromotive assembly containing the energy transformation unit within the capsule 6 and guide elements 20 adjacent the upstream open end 25 of the hydromotive assembly are dispensed with. Instead, guide members 20' are attached to the exterior of the diffuser 16 are movably connected thereto such as by the pivot 36. The downstream open end 24' will be seen to be modified to provide a smoothly curved downstream face 37 which is intended to cooperate with the complimentary faces of the upstream spillway vane extensions 33, which vanes are fastened to the upstream face of the dam main body by means of the extensions 34.

Operation of this second embodiment will be apparent from a review of FIG. 5 of the drawings wherein it will be seen that upon actuation of suitable hydraulic jacking means 20, 21', the hydromotive assembly 17 will be controllably displaced from the illustrated elevated position to an alternate lowered position wherein the curved open end 24' of its conduit will be lowered to a point below the water passage through the spillway fluid directing means. During the aforedescribed displacement the guide members 20' are moved to their lowermost position upon the vertically disposed legs 19 as they pivot about the points 36 while at the same time, the entire body of the hydromotive assembly 17 is pivoting about the fixed pivot 35. In this lowestmost described position, it will be appreciated that the hydromotive assembly will be removed from its sealed engagement with the walls of the vane extensions 33 and exposes the dam water passageway to the unrestricted passage of water below the upstream level 22 to a point downstream thereof as reflected by the downstream water level 23.

From the foregoing it will be apparent that the diffuser water retaining structure may be provided with embodied hermitic chambers suitable for filling with water for sinking purposes, or with gas for flotation purposes, so as to replace the duties performed by mechanical jacking arrangements and other motion producing means.

For servicing the chambers and energy transformation unit of the hydromotive assembly when in the installed positions as shown in the drawings, appropriate access means 12 extends upwardly therefrom and includes a removable cover 15.

I claim:

1. A water storing dam including a main body, means for directing a fluid flow through said dam main body, one or more hydromotive assemblies positioned against said dam main body, each said hydromotive assembly having an internal conduit defining a fluid flow circulation path for directing a flow of water therethrough, an energy generation unit having at least one component within said conduit, said hydromotive assembly having a first open end and a second open end for discharging water flow entering said first open end and transversing said conduit, one of said open ends adapted to be positioned adjacent said dam fluid flow directing means and means mounting said hydromotive assembly adjacent said dam main body, said mounting means including means controllably movably displacing said hydromotive assembly relatively said main body of said dam.

2. A water storing dam according to claim 1 wherein, said mounting means defining two vertically spaced alternate positions for said displaceable hydromotive assembly, said hydromotive assembly when in the uppermost of said positions having said second end juxtaposed said dam fluid directing means with said fluid conduit communicating with said dam fluid directing means and when said hydromotive assembly disposed in the lowermost of said positions having said second end fully removed from juxtaposition said dam fluid directing means.

3. A water storing dam according to claim 2 including, pivot means anchoring one portion of said hydromotive assembly, said pivot means having its axis substantially paralled said dam main body whereby, said hydromotive assembly second end is vertically displaced between said alternate positions.

4. A water storing dam according to claim 1 including, water retaining means adjacent said hydromotive assembly second open end whereby, when said second end is juxtaposed said fluid directing means a seal is provided therearound and all water passing therethrough is received from said hydromotive assembly conduit.

5. A water storing dam according to claim 1 including, an integral diffuser having said second open end, said diffuser conduit having a longitudinal axis inclined upwardly from the balance of said hydromotive assembly conduit, said mounting means defining two alternate positions for said displaceable hydromotive assembly, said hydromotive assembly when in a first one of said positions having said second end juxtaposed said dam fluid directing means with said fluid conduit communicating with said fluid directing means and when said hydromotive assembly in the second of said positions having said second end fully removed from juxtaposition said fluid directing means.

6. A water storing dam according to claim 1 including, an energy generation unit within said hydromotive assembly conduit, said unit having a generator connected to a turbine.

7. A water storing dam according to claim 1 wherein, said displacing means includes at least one chamber within said hydromotive assembly of a volume at least sufficient to produce floatation or sinking of said hydromotive assembly when filled with gas or liquid respectively, to displace said second open end toward or away from said fluid directing means.

8. A water storing dam according to claim 1 wherein, said dam main body fluid flow directing means defines a spillway outlet, and a displaceable gate across said outlet.

9. A water storing dam according to claim 8 including, water retaining means adjacent said hydromotive assembly second open end whereby, when said second end is juxtaposed said outlet and said gate is raised all water passing therethrough is received from said hydromotive assembly conduit.

10. A water storing dam according to claim 1 wherein, said mounting and displacement means includes a plurality of vertical legs disposed within guide members on said hydromotive assembly.

11. A water storing dam including a main body, means for directing a fluid flow through said dam main body, one or more hydromotive assemblies positioned against said dam main body, each said hydromotive assembly having an internal conduit defining a fluid flow circulation path for directing a flow of water therethrough, an energy transformation unit incorporated within said conduit, said hydromotive assembly having a first open end and a second open end for discharging water flow entering said first open end and transversing said conduit when said unit is actuated by said water flow to produce energy therefrom, said energy transformation unit performing to accumulate energy when water is directed into said second open end and discharged from said first open end, one of said open ends adapted to be positioned adjacent said dam fluid flow directing means and means mounting said hydromotive assembly adjacent said dam main body, said mounting means including means controllably movably displacing said hydromotive assembly relatively said main body of said dam.

12. A water storing dam according to claim 11 wherein, said energy transformation unit includes a motor/generator connected to a runner, said runner performing as a pump when said water flow is in said energy accumulation mode and as a turbine when in said energy producing mode.

* * * * *

UNITED STATES PATENT AND TRADEMARK OFFICE
CERTIFICATE OF CORRECTION

PATENT NO. : 4,143,990
DATED : March 13, 1979
INVENTOR(S) : Francisco J. Gutierrez Atencio It is certified that error appears in the above-identified patent and that said Letters Patent are hereby corrected as shown below:

Col. 2, lines 18 and 19, change "finanical" to -- financial --.

Col. 5, line 64, change "hermitic" to -- hermetic --.

Signed and Sealed this

First Day of June 1982

[SEAL]

*Attest:*

*Attesting Officer*

GERALD J. MOSSINGHOFF

*Commissioner of Patents and Trademarks*